United States Patent
Fleischanderl et al.

(10) Patent No.: US 7,597,736 B2
(45) Date of Patent: Oct. 6, 2009

(54) METHOD FOR UTILIZING SLAG

(75) Inventors: Alexander Fleischanderl, Grünau (AT); Udo Gennari, Hellmonsödt (AT)

(73) Assignee: Siemens Vai Metals Technologies GmbH & Co (AT)

( * ) Notice: Subject to any disclaimer, the term of this patent is extended or adjusted under 35 U.S.C. 154(b) by 0 days.

(21) Appl. No.: 11/280,679

(22) Filed: Nov. 16, 2005

(65) Prior Publication Data
US 2006/0065071 A1 Mar. 30, 2006

Related U.S. Application Data

(63) Continuation of application No. PCT/AT2004/000161, filed on May 10, 2004.

(30) Foreign Application Priority Data
May 16, 2003 (AT) ................. A 753/2003

(51) Int. Cl.
  C22B 7/04 (2006.01)
  C21B 13/12 (2006.01)
  C21C 7/072 (2006.01)
(52) U.S. Cl. .......... 75/10.35; 75/10.42; 75/10.63
(58) Field of Classification Search ............. 75/10.35, 75/350, 10.63, 544, 10.42, 531, 560, 561; 266/171, 225
  See application file for complete search history.

(56) References Cited

U.S. PATENT DOCUMENTS

| | | | | |
|---|---|---|---|---|
| 5,788,921 A * | 8/1998 | Gitman et al. | ............ | 266/225 |
| 5,882,375 A * | 3/1999 | Edlinger et al. | ............ | 75/10.35 |
| 6,010,553 A * | 1/2000 | Edlinger et al. | ............ | 75/434 |
| 6,368,548 B1 * | 4/2002 | Innes | ............ | 266/171 |
| 6,635,096 B1 * | 10/2003 | Roth | ............ | 75/10.4 |
| 2003/0140732 A1 * | 7/2003 | Edlinger | ............ | 75/561 |

(Continued)

FOREIGN PATENT DOCUMENTS
EP 723129 A2 * 7/1996

(Continued)

OTHER PUBLICATIONS

English translation of WO 00/75385 A1.*

(Continued)

Primary Examiner—George Wyszomierski
Assistant Examiner—Tima M McGuthry-Banks
(74) Attorney, Agent, or Firm—Ostrolenk Faber LLP (57) ABSTRACT

In a process for utilizing slag containing oxidic iron particles, adding a reducing agent and reducing oxidic iron particles of the slag are charging the slag into a reactor vessel onto a residual iron metal containing dissolved carbon, slowly and continuously over an extended period of time, electric heating the slag and the iron melt over an extended period of time, injecting a carbon-containing reducing agent with inert gas over an extended period of time by a lance into a region close to the boundary surface between the slag and the iron melt or directly into the iron melt, dissolving the carbon of the reducing agent in the iron melt and reducing oxidic iron particles of the slag with metallic iron and CO being formed, over an extended period of time, forming a foamed slag by the resulting CO over an extended period of time, introducing an oxygen-containing gas or oxygen into the foamed slag and post-combustion of CO to $CO_2$ over an extended period of time, bottom flushing the reactor vessel with inert gas over an extended period of time, discharging the treated slag and optionally subsequently the discharging iron melt, whereby a residual iron melt containing dissolved carbon is left in the reactor vessel.

27 Claims, 3 Drawing Sheets

FOREIGN PATENT DOCUMENTS

| | | | |
|---|---|---|---|
| JP | 06-221773 | * | 8/1994 |
| WO | WO 96/34989 | | 11/1996 |
| WO | WO 00/01852 | | 1/2000 |
| WO | WO 00/75385 A1 | | 12/2000 |

OTHER PUBLICATIONS

English translation of WO 00-01852 A1.*
United States Steel, The Making, Shaping and Treating of Steel, 10th edition, 1985, p. 336.*
Machine translation of JP 06-221773.*
Derwent Abstract 1986-148048 of JP 61083877 A published Apr. 28, 1986.*
English abstract of JP 63038506 A published Feb. 19, 1988.*
"Reduction of steel-making slags for recovery of valuable metals and oxide materials" by Guozhu Ye et al., Scandinavian Journal of Metallurgy, Dec. 31, 2003, pp. 7 & 9.
International Preliminary Report on Patentability for PCT/AT2004/000161 dated Mar. 23, 2006.
English translation of WO 00/75385 A1, published Dec. 14, 2000.
English translation of WO 00-01852 A1, published Jan. 13, 2000.
Machine translation of JP 06-221773, published Aug. 12, 1004.

* cited by examiner

METHOD FOR UTILIZING SLAG

CROSS REFERENCE TO RELATED APPLICATION

The present application is a continuation of PCT/AT2004/000161, filed May 10, 2004, which claims priority of Austrian Application No. A 753/2003, filed 16 May 2003. The PCT International Application was published in the German language.

BACKGROUND OF THE INVENTION

The invention relates to a process for the utilization of slag coming from the ironworks industry and containing oxidic iron particles with a reducing agent being added and with oxidic iron particles of the slag as well as other metal oxides which optionally are provided being reduced by means of said reducing agent, as well as to an installation for carrying out the process.

Processes for the beneficiation of slags from the ironworks industry are aimed at forming environmentally compatible slags, which in particular are economically usable and, for instance, can be used as raw materials for the production of cement clinker substitute.

Processes of this kind are known, for example, from WO 96/24696 or from WO 97/46717. Thereby, iron-oxide containing liquid slags such as steelworks slag are mixed with iron-oxide carriers such as iron ores, basic weak ores, rolling mill scale or metallurgical dusts and lime and the ferrite slag thus formed is reduced in a reduction reactor whereby an iron bath and a sintering phase are formed with carbon being burnt, or hot air is injected, respectively.

A disadvantage of these known processes is the high amount of waste gas and the high dust loss resulting from the injection of residual materials and coal from below through the bath. Another disadvantage consists in that the heat loss caused by the endothermic reduction process during the reduction of the iron-oxide particles of the slag is compensated for chemically or by hot air, i.e. chemically by the combustion of carbon. These measures cause high turbulences and hence also high carbon losses due to the higher dust content and the larger amount of waste gas. The chemical heating caused by the combustion of carbon affects the chemical equilibria and hence the course of the process during the treatment of the slag. The high $CO_2$ emissions inevitably arising thereby constitute an economic disadvantage in view of the $CO_2$ taxes which will soon be payable and are not consistent with the trend toward sustainable processes. Furthermore, the utilization of slag takes place in converters or stationary reduction reactors of a complex design, necessitating high investment costs.

Another disadvantage of the known processes is that the operation is discontinuous, i.e. slag to be treated is charged, finished and after that is cast or tapped, respectively. This involves vigorous reactions for each slag batch, accompanied by a substantial change in the chemical compositions of the phases present in the reactor vessel, which in turn causes a high strain on the fireproof lining of the reaction vessels, i.e. of the converters or stationary reduction reactors. This high strain is additionally intensified by the above-mentioned chemical heating.

SUMMARY OF THE INVENTION

The invention aims at avoiding said disadvantages and difficulties and has as its object to provide a process of the initially mentioned kind and an installation for carrying out the process, which can get by with simple means, which means that only low investment costs should be required. Furthermore, dust losses are to be avoided as much as possible and only minor maintenance and repair works should become necessary, i.e. the chemical composition of the phases present in the reactor vessel should change continuously and in total only slightly by the charging of slags and the injection of dusts. Another essential aspect is that the heat consumption occurring in the endothermic reduction is compensated for by the supply of heat which does not cause any changes in chemical equilibria so that the beneficiation of slag can take place uninfluenced by the introduction of heat, i.e. the supply of energy. This kind of heat supply should also bring about a lower $CO_2$ emission than in the described prior art in order to be able to make use of the advantages of $CO_2$ savings in view of the $CO_2$ tax which will be due in future. The amount of waste gas which is reduced compared with the prior art also leads to a lower dust emission and hence to a more efficient utilization of the introduced materials.

According to the invention, this object is achieved by a combination of the following features:

- charging the slag into a reactor vessel, preferably into a tiltable pan reactor, onto a residual iron melt containing dissolved carbon, slowly and continuously over an extended period of time,
- electric heating of the slag and of the residual iron melt as well as of a newly formed iron melt over an extended period of time,
- injecting a carbon-containing reducing agent with gas, preferably with inert gas, over an extended period of time by means of a lance into a region close to the boundary surface between the slag and the iron melt or directly into the iron melt, whereby carbon is dissolved in the iron melt and iron melt and slag are mixed,
- dissolving the carbon of the reducing agent in the iron melt and
- reduction of oxidic iron particles of the slag, with metallic iron and CO being formed, over an extended period of time,
- formation of a foamed slag by the resulting CO over an extended period of time,
- introducing an oxygen-containing gas or oxygen into the foamed slag and postcombustion of CO to $CO_2$ over an extended period of time,
- bottom flushing of the reactor vessel with inert gas over an extended period of time,
- discharging the treated slag and optionally
- subsequently the discharging of iron melt, whereby a residual iron melt containing dissolved carbon is left in the reactor vessel.

The charging of the liquid slag results from an adjustment to the charging times of the steelworks converters (e.g. LD converters or AOD converters in a stainless steel mill) and of the amounts of liquid slag produced thereby. The aggregate size and charging speed are adjusted such that the amount(s) of slag accumulating in the steelworks converter(s) can be treated in the time period between the tappings in the reduction reactor according to the invention. In doing so, the amounts of slag can also be collected from two or more converter batches and can then be charged continuously into the reduction reactor.

Due to the fact that the slag is introduced slowly and continuously over an extended period of time, comparatively small amounts of slag to be treated get into the reactor vessel per unit of time and based on the amount already present so that the chemical composition of the phases present in the reactor vessel will vary only slightly. Hence, a so-called "quasi-continuous" operation, i.e. a continuous conversion of the used substances, is ensured even if the discharging of the treated slag always occurs discontinuously at the latest when the maximum capacity of the reactor vessel has been reached.

"Quasi-continuity" is also ensured by electrically heating the continuously growing amount of slag and the residual iron melt as well as the newly formed iron melt over an extended period of time. In addition, the chemical reactions remain unaffected by the heating process. This involves the advantage that the chemical reactions can be managed and controlled more easily, which has a positive effect on the quality of the discharged products, i.e. of the treated slag and of the treated iron melt.

Another essential advantage results from the injection of the carbon-containing reducing agent directly into the iron melt or into a region close to the boundary surface between the slag and the iron melt, respectively, since this inevitably entails the dissolution of almost the entire amount of carbon injected into the iron melt and, via the ascending blow gas, a mixing of iron melt and slag and thus a direct reduction proceeding in an optimal fashion. Thereby, the direct contact of the carbon-containing metal droplets with the metal-oxide containing slag plays an important role, namely via the large interface thus formed which is available for reduction. The result is a direct reduction of the reducible metal oxides of the slag with the carbon dissolved in the metal melt.

The introduction of the reducing agents by means of a lance is of importance as well, particularly since, in this manner, an ideal possibility of regulation (adjustment of a particular height) is provided for the process, in contrast to bottom tuyeres which would blow the added agents upwards, which would result in a substantial loss of these agents due to the so-called blowing through with the injection gas into the waste gas stream and hence in a large accumulation of dust. Furthermore, using lances, a longer residence time of the reducing agents in the metal bath and thereby a more efficient detachment of the carbon from the reducing agent in the metal bath is achieved.

Preferably, also residual materials, in particular metallurgical residual materials such as scrap yard residues, iron-oxide containing dusts and slurries from gas-purification processes, scales etc., can be injected slowly and continuously with gas, preferably with inert gas, over an extended period of time by means of a lance, into a region close to the boundary surface between the slag and the iron melt or directly into the iron melt, with iron melt and slag being mixed.

This also applies to the injection of auxiliary agents such as bauxite, advantageously residual materials from the extraction of bauxite such as red sludge and/or lime powder and/or silicon carriers, advantageously Si-containing residual materials such as fly ashes, cauldron ashes or spent foundry sands, which are also injected slowly and continuously via gas, preferably with inert gas, over an extended period of time by means of a lance, into a region close to the boundary surface between the slag and the iron melt or directly into the iron melt, whereby, in each case, iron melt and slag are mixed.

For the treatment of slag, it may be advantageous if the residual materials and/or auxiliary agents are injected into the reactor vessel at a different level than the reducing agent, preferably above the injection of the reducing agents, for example directly into the region of the boundary layer between the iron melt and the foamed slag forming above said iron melt.

According to a preferred embodiment, the injection of a carbon-containing reducing agent and/or of residual materials and/or of auxiliary agents is effected transversely against the boundary surface of the iron melt present in the reactor vessel and of the slag located above said iron melt.

For the process according to the invention, it is ideal if the process steps to be carried out over an extended period of time are carried out basically from a discharging of slag as well as optionally of iron melt until the subsequent discharging of slag and thus essentially synchronously.

Since the amount of mineral materials in the metallurgical residual materials to be processed, especially in slags and dusts, is higher than that of the reducible metal oxides, there will be a far more extensive production of treated slag than of treated iron melt so that slag will be discharged several times in a row and only afterwards iron melt will be cast. If the process steps to be carried out over an extended period of time occur in each case in the time period between two successive dischargings of slag, optionally after the discharging of iron melt and subsequently of slag, the residual materials to be treated, i.e. especially slags and dusts, can be added in the smallest possible amounts per unit of time which are compatible with the logistics of the steelworks facility, i.e. of the liquid slag which has been produced and is to be processed per unit of time. However, it might be necessary to temporarily interrupt the introduction of slag and/or the injection of residual materials and/or reducing agents, for example, in order to replace an empty slag vessel with a full one or in order to take intermediate samples or in order to carry out an adjustment of the slag composition by temporarily increasing the introduction of auxiliary agents, etc. In accordance with the process according to the invention, these interruptions of charging and injection but also of electric heating are feasible independently from each other so that an ideal adjustment to the requirements is possible within a time period between two slag tappings.

In order to prevent carbon from blowing through and into the waste gas and in order to prevent, respectively, the combustion of carbon in the oxidative zone in the upper region of the foamed slag, the injection of a carbon-containing reducing agent is preferably carried out only for so long until the maximum saturation limit of carbon has been reached in the iron melt.

In order to ensure an efficient postcombustion of a part of the CO forming during reduction, which postcombustion does not impair the reduction process, an oxygen-containing gas or oxygen is suitably introduced into the slag in the upper half, advantageously in the uppermost third of the height of the slag.

It has turned out to be advantageous if especially the auxiliary agents and/or residual materials are injected in a height region on both sides of the boundary surface between the slag and the iron melt, which height region extends over a maximum of 25% of the total height of the slag, or in an identical height region in the iron melt, respectively, preferably extending over a maximum of 10% of the total height of the slag, or laterally reversed thereto, respectively, in the iron melt.

For a particularly quick conversion of the introduced substances, these substances are suitably injected via lateral discharge openings of the lance in a roughly horizontal direction or slightly transversely toward the idealized flat boundary surface.

Preferably, electric heating is effected via an electric arc and/or resistance heating in case the burning of an electric arc is impossible due to the foamed slag that is forming.

Preferably, the slag is charged at least partially in a liquid form.

A specific process feature consists in that the reduction of the metal oxides is primarily effected via direct reduction by means of the carbon dissolved in the metal melt, rather than by specifically producing CO gas via the combustion of carbon with oxygen and using the same.

In order to reduce poorly reducible compounds such as, for example, MnO, $Cr_2O_3$, $P_2O_5$ to low values which appropriately are desired in the treated slag, reducing agents which are stronger against carbon such as aluminium, ferrosilicon, calcium carbide etc. are used, preferably in the final stage of reduction prior to the discharging of the treated slag.

In order to additionally condition the properties of the treated slag, if necessary, a further addition of auxiliary agents takes place upon completion of the addition of reducing agents. Said addition, which is possible according to the invention, is temporally independent and can be carried out in a controlled manner, has the advantage, among other things, that a more efficient reduction of oxides such as MnO or $P_2O_5$ can occur initially at a lower basic strength and that only subsequently the slag composition is adjusted to the desired basic strength.

Furthermore, the process according to the invention enables the introduction of iron-oxide containing ores such as fine ores, chromic iron ores etc., advantageously likewise via an injection lance.

According to the invention, a foamed slag of a height that is as large as possible is supposed to form, wherein the height of the reduction reactor vessel is made use of, which, therefore, is chosen to be larger. For this reason, the height of the slag is advantageously measured and corrective measures are taken if the maximum admissible height is exceeded and a limiting value of the slag height is fallen short of.

Preferably, a depositing of metal droplets from the slag is awaited after the introduction of residual materials and/or auxiliary agents and/or reducing agents and prior to the discharging of the treated slag.

In order to avoid damage to the fireproof material in the reactor vessel and in order to save on the input of energy, the slag is suitably treated in the reactor vessel at a lower temperature than for the granulation of the treated slag.

An installation for carrying out the process is characterized by the following features:
a tiltable pan reactor in whose interior the height exceeds the largest diameter and which is furnished with
gas, preferably inert gas, supplying bottom tuyeres and/or bottom flushing bricks,
at least one lance supplying oxygen and being insertable from above into the pan reactor,
with at least one lance supplying a carbon-containing reducing agent, which lance is insertable from above into the pan reactor,
and with an electric heating device, preferably with electric arc electrodes insertable from above.

In order to be able to introduce the slag to be treated into the reactor vessel over an extended period of time, a slowly tiltable slag charging device for liquid slag is provided, wherein the tilting speed is adjusted to the periods following the charging of the liquid slag arising from the primary technical units, especially from the converters (usually LD converters or AOD converters, respectively, in case of stainless steel mills).

For the introduction of solidified slag, a separate charging device has turned out to be convenient; preferably, said device is designed as a vibrating chute or as a spout or as a combination vibrating chute/spout.

Advantageously, the pan reactor is equipped with at least one lance introducible from above for the injection of residual materials and/or auxiliary agents.

In order to be able to charge also comparatively large lumpy feed materials such as scrap packages etc., the reactor vessel is furnished with an opening rendering this possible. Said opening is located in the lid of the reactor vessel which advantageously also serves for maintaining a negative pressure for the suction of waste gases.

A preferred embodiment is characterized in that the lance exhibits at least one discharge opening for the reducing agent and at least one discharge opening for residual materials and/or auxiliary agents which is arranged on a higher level.

BRIEF DESCRIPTION OF THE DRAWINGS

In the following, the invention is illustrated in further detail by means of a flow diagram shown in
FIG. 1 as well as by way of several exemplary embodiments.

DESCRIPTION OF A PREFERRED EMBODIMENT

Figure 1:
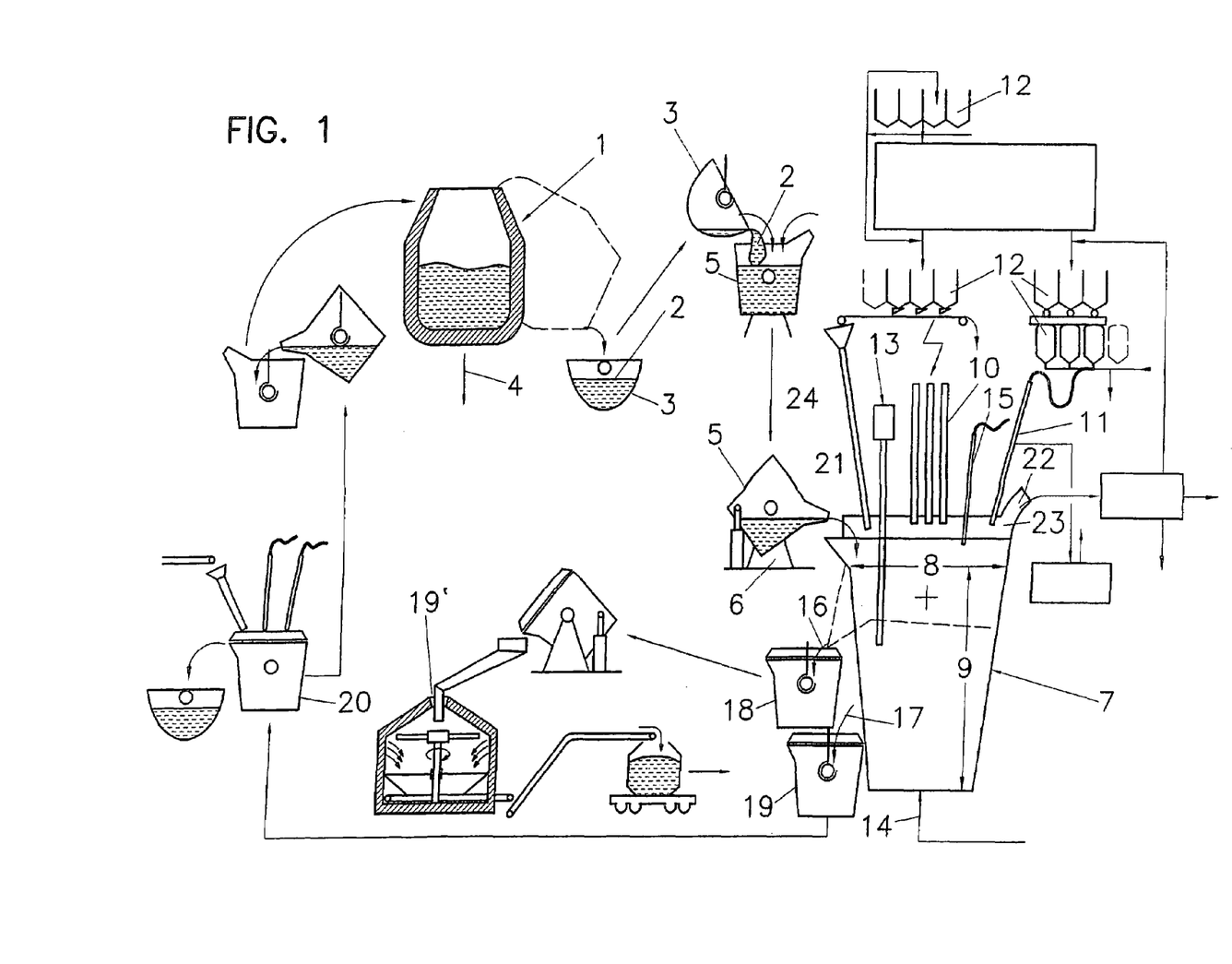

A steelworks converter is indicated by 1, from which steelworks converter, on the one hand, the slag 2, in the illustrated case LD slag, is cast into a slag ladle 3 and, on the other hand, steel 4 is discharged. From said slag ladle 3, the slag 2 gets via a transport ladle 5 to a tilting stand 6, which allows the liquid slag 2 to be treated to flow slowly and continuously into an upright tiltable pan reactor 7 by tilting the transport ladle 5.

The charging of the slag 2 is preferably carried out in the liquid form for those slags for which such kind of charging is logistically possible and reasonable. This is possible, for instance, in case of converter slag (LD slag for C steel and AOD slag for stainless steel, respectively). The reason for this preferred type of charging is the energetic advantage as a result of the high heat content of the liquid slag 2, involving a correspondingly smaller energy demand for heating and reducing the metal oxides.

A residual iron melt 25 is still contained in the pan reactor 7 after the final tapping of the slag 2. Said melt is tapped completely only for repair works, otherwise at least one metal sump of a sufficient height (typically at least 0.6 m) always remains in the reactor vessel 7. Typically after every fifth slag tapping, the additional metal bath which has formed in the meantime as a result of the reduction of the metal oxides is tapped as well so as not to exceed a maximum metal bath height (typically approx 1.25 m) and, consequently, in order to retain sufficient freeboard for the formation of the foamed slag.

During the period of filling in the liquid slag 2, a reduction of the metal oxides (primarily $FeO_x$, in addition also MnO; in case of stainless slag also significant amounts of $Cr_2O_3$ and NiO) which are contained already occurs as a result of a reaction with the dissolved carbon contained in the metal.

Figure 2:
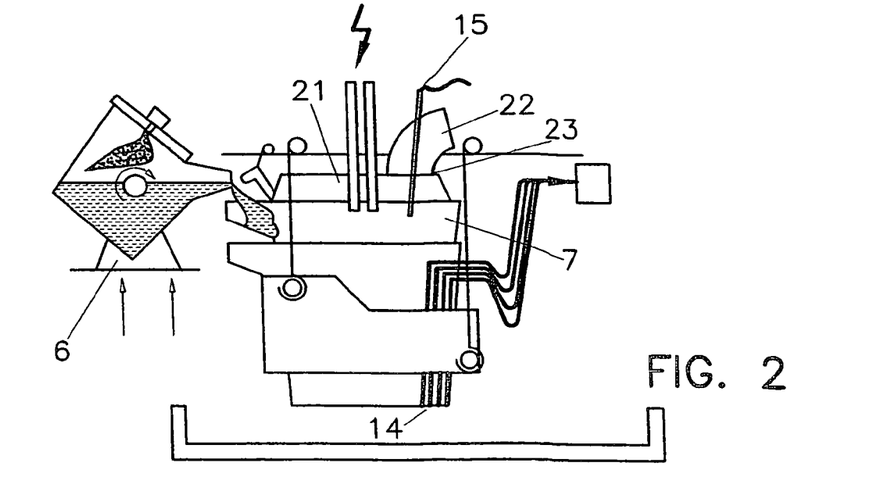
FIG. 2 illustrates a reactor vessel according to the invention in side view.

The tiltable pan reactor 7 has a height 9 which exceeds the largest inner diameter 8. It is provided with an electrode heating 10 as well as with one or several lances 11 insertable from above for the injection of feed materials supplied from storage containers 12 such as reducing agents, auxiliary agents and/or residual materials and/or ores, which injection is effected with inert gas, as well as with a device 13 for sample taking. These lances 11 are provided preferably at their lower ends with laterally arranged discharge openings for the substances to be introduced. Flushing tuyeres 14 for the introduction of an inert gas such as nitrogen are provided at the bottom of the pan reactor 7. Furthermore, a lance 15 serves for the injection of oxygen. Said lance reaches only into the upper part of the interior space, i.e. into the foamed slag that is forming.

For the discharging of treated slag 16 and of treated iron melt 17, the pan reactor 7 is tilted and the treated slag 16 is poured into a transport ladle 18 and then taken to a granulation device 19'. If iron melt 17 is discharged, this is likewise effected by tilting the pan reactor 7 after the discharging of slag 16, which iron melt 17 is optionally conveyed by means of a transport ladle 19 to a ladle treatment stand 20 and then to the converter 1.

Figure 3:
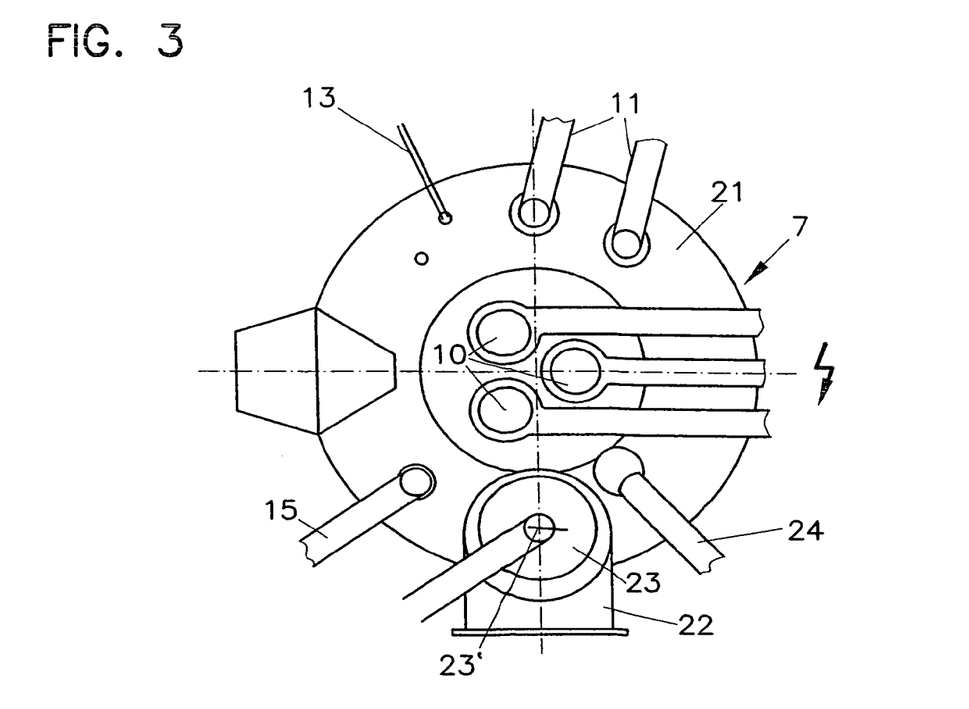
FIG. 3 shows said vessel in top view.

As can be seen in FIGS. 2 and 3, the electrodes 10 penetrate centrally through a lid 21 of the pan reactor 7, which lid serves for waste gas suction, whereas the lance 15 supplying oxygen is provided beside the opening 23 provided in the lid 21, connected to an exhaust line 22 and furnished with a burner 23'.

A conveying means as schematically illustrated in FIG. 1, for example a vibrating chute 24, serves for the introduction of solidified slag, by means of which chute the solid lumpy slag can be introduced into the pan reactor 7 also over an extended period of time, preferably for the time period between two casting operations.

Figure 4:
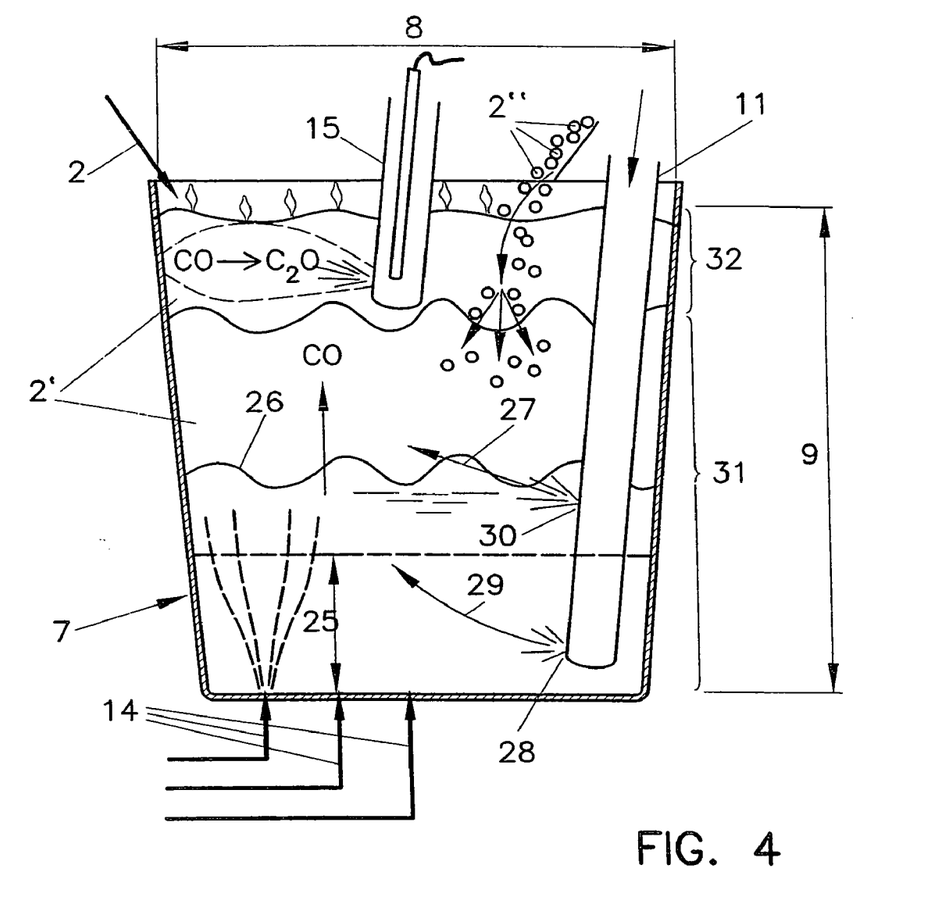
FIG. 4 shows a sectional view of the reactor vessel during insertion.

FIG. 4 illustrates the processes in the interior of the pan reactor 7. Said reactor exhibits a residual melt 25 of iron (pig iron) which is supplemented by newly formed iron melt. Slag 2' in the foamed state is located above the iron melt 25. It can be seen that a lance 11 reaches deep into the interior of the pan reactor 7 and comprises, at its lower end, a lateral discharge opening 28 for the introduction of reducing agent 29. Said end of the lance 11 configured as a dual-port lance is pushed forward into the iron melt 25. Above that, close to the level of the boundary surface 26 between the iron melt 25 and the slag 2', the lance 11 has another lateral discharge opening 30 for the introduction of auxiliary agents and/or residual materials 27 and optionally ores. The introduction of solid slag 2" is likewise illustrated in said Figure.

The oxygen-supplying lance 15 projects into the upper region of the foamed slag 2' and provides for a postcombustion of the CO forming during the reduction of the slag. In said height region, an oxidative zone 32 is formed above a reductive zone 31.

In order to accelerate the reaction, inert gas, preferably nitrogen, is injected via the flushing tuyeres 14 inserted in the bottom of the pan reactor 7.

For controlling the height of the foamed slag, a device for measuring the height of the foamed slag is provided, which can be achieved by means of a camera, laser or ultrasound.

The operation of the installation according to the invention is illustrated below by way of two examples.

EXAMPLE A

The indicated amounts of slags and residual materials are typical specific amounts as they accumulate during the production of 1 ton of liquid steel (LS), carbon steel such as, e.g., structural steel, according to the LD process.

The amounts of reducing agent 29, auxiliary agents 27 and electric energy which are necessary therefor are indicated as well.

TABLE 1

Feed materials

| Components | LD slag % | Ladle slag % | De-S slag % | LD dust % | HO dust % | Scales % | Fly ash % |
|---|---|---|---|---|---|---|---|
| $Al_2O_3$ | 2.62 | 18.72 | 3.59 | 0.21 | 1.73 | 0.56 | 19.44 |
| C | 0.09 | 0.00 | 4.30 | 1.44 | 27.41 | 0.00 | 10.76 |
| CaO | 40.35 | 41.41 | 12.60 | 7.47 | 5.28 | 0.00 | 4.28 |
| $Cr_2O_3$ (Cr) | 0.64 | 0.00 | 0.00 | 0.00 | 0.00 | 0.19 | 0.01 |
| Fe | 0.49 | 0.19 | 59.32 | 15.15 | 1.02 | 1.49 | 0.48 |
| FeO | 15.20 | 0.00 | 4.41 | 25.55 | 7.72 | 63.98 | 0.97 |
| $Fe_2O_3$ | 8.38 | 0.00 | 0.00 | 46.68 | 45.68 | 25.78 | 4.60 |
| MgO | 6.16 | 14.75 | 3.69 | 0.31 | 1.42 | 0.23 | 3.19 |
| MnO (Mn) | 4.67 | 0.41 | 0.82 | 0.93 | 1.42 | 1.36 | 0.10 |
| NiO (Ni) | 0.00 | 0.00 | 0.00 | 0.00 | 0.00 | 0.13 | 0.00 |
| $SiO_2$ (Si) | 17.18 | 22.59 | 10.66 | 0.82 | 6.80 | 2.39 | 51.21 |
| $TiO_2$ (Ti) | 0.53 | 0.23 | 0.00 | 0.00 | 0.00 | 0.00 | 0.85 |

110 kg/t LS of liquid LD slag 2 of the composition as indicated in Table 1 is cast from the LD converter 1 into a slag ladle 3. The content of said slag ladle 3 is tipped into a transport ladle 5. Subsequently, the transport ladle 5 is mounted to a tilting stand 6 and the liquid slag 2 is poured slowly and continuously onto a pig-iron metal bath 25 in a tiltable pan-furnace-like reduction unit 7.

12 kg/t LS of pan-furnace slag 2" and 8 kg/t LS of desulphurization (De-S—) slag are charged slowly and continuously via a vibro-chute 24 and a spout into the pan reactor 7 (composition also in Table 1).

The energy (90 kWh/t LS) required for heating the slag 2, 2" and for the compensation of heat losses as well as for the endothermic direct reduction of metal oxides (especially iron oxide) by means of dissolved carbon is introduced electrically via three electrodes 10.

The reduction of the metal oxides of the introduced slag 2, 2" already occurs during filling in and concurrent heating via direct reduction, using the carbon dissolved in the liquid pig iron 25. The spent carbon is replaced by the deep injection of reducing agent 29, i.e. 4.7 kg/t LS of coal dust and 2 kg/t LS of coke, into the metal bath 25 (analyses: see Table 2).

TABLE 2

Reducing agents

| Components | Coal % | Coke % |
|---|---|---|
| C | 83.18 | 91.66 |
| $Al_2O_3$ | 2.83 | 1.79 |
| CaO | 0.57 | 0.26 |
| $Fe_2O_3$ | 0.74 | 0.00 |
| MgO | 0.45 | 0.15 |
| $SiO_2$ | 5.20 | 2.98 |
| $TiO_2$ | 0.16 | 0.07 |

In addition to the reducing agent 29, the residual materials 27 which typically accumulate in a C-steelworks operation, i.e. 17 kg/t LS of LD dust, 15 kg/t LS of blast-furnace dust and 5 kg/t LS of scales, are injected with $N_2$ via injection lances 11 (compositions in Table 1). The injection of these iron-oxide containing residual materials occurs close to the boundary layer 26 between iron melt 25/slag 2 in order to enlarge the surface of said boundary layer.

In order to adjust the optimal slag composition for a hydraulic binder as a clinker substitute, 35 kg/t LS of fly ash is additionally injected as an $SiO_2$ supplier.

6 $Nm^3$ $N_2$/t LS is required for the pneumatic injection and bottom flushing.

Reduction takes place at a temperature of 1420° C. In said temperature range, a foamed slag 2' forms due to the CO forming during reduction. The large contact area of the metal oxides with the metal droplets selectively dispersed therein produces an efficient direct reduction via the carbon dissolved in the metal droplets. In order to improve the energy balance and to achieve the indicated electric heating capacity value, a partial postcombustion of the CO forming during reduction is effected by means of $O_2$. 4 kg/t LS of $O_2$ is injected via $O_2$-lances 15 in the upper third of the foamed slag 2' and oxidizes 25% of the CO to $CO_2$. This comparatively low degree of postcombustion is easily controllable and results in an efficient heat transfer of the energy released thereby back into the foamed slag 2' and into the metal melt 25. The injection of $O_2$ is performed such that said oxidation zone 32 is prevented, as far as possible, from mixing with the reduction zone 31, in which the reduction of the metal-oxide particles takes place.

As a result of the subsequent complete combustion, only $CO_2$ can be found in the waste gas, namely 45 kg/t LS. This is a very low value which can be achieved only by the preferred direct reduction and electric heating and correspondingly provides advantages in view of the impending $CO_2$-taxes.

At 1 kg/t LS, the dust content is extremely low because of the deep injection of coal and due to the filter effect of the foamed slag 2', which represents an advantage in terms of the discharging and avoidance of filter dust.

After the conversion of the entire amount of LD slag 2, upon completion of the injection of the remaining residual materials 27 and of the reducing agent 29 and upon completion of the reduction, a slag sample is drawn and conformity with the precalculated analysis is checked. The achieved target analysis of 125 kg/t LS of slag 16 that has been produced is included in Table 3.

TABLE 3

Slag product

| Component | % |
|---|---|
| CaO | 45.60 |
| SiO2 | 33.82 |
| Al2O3 | 10.52 |
| MgO | 7.24 |
| MnO | 1.20 |
| TiO2 | 0.80 |
| FeO | 0.20 |
| Fe_met. | 0.10 |
| Cr2O3 | 0.20 |
| P2O5 | 0.30 |
| Sum | 99.98 |

Subsequently, the temperature is raised to 1450° C. in order to obtain, on the one hand, the temperature required for the subsequent granulation of the treated slag 16 and in order to promote, on the other hand, the depositing of the dispersed metal droplets from the foamed slag as a result of the reduced viscosity. For this purpose, a latency of 5 min is observed.

Subsequently, the slag except for a remaining quantity is poured into a transport ladle 18 by tilting the reactor vessel 7. The content of the transport ladle 18 is charged into a dry granulator 19. Granulation involving a quick and thus glasslike solidification is effected by splitting the slag jet into fine droplets on a rotation disk and by rapidly cooling the fine droplets in the air stream.

The metal bath 25 including 54 kg/t LS of metal obtained from reduction (analysis: see Table 4) is not tapped after each slag treatment in the pan reactor 7 but remains therein until sufficient freeboard for the foamed slag 2' is no longer provided. Typically, this is the case after five treatments, however, if necessary, it may be varied via the geometry of the pan reactor 7.

TABLE 4

Metal product

| Component | % |
|---|---|
| Fe | 87.11 |
| C | 4.00 |
| Mn | 6.10 |
| Cr | 0.90 |
| Ni | 0.01 |
| P | 1.44 |
| S | 0.04 |
| Sum | 99.60 |

Subsequently, the pan reactor 7 is brought back into the treatment position, and the next batch of LD slag 2 is again added slowly and continuously. The remaining process steps are also repeated according to the above-indicated pattern.

Following the five treatments, also the metal bath 25, except for a metal sump of a height of at least 0.6 m, is tapped and is subjected to De-P treatment. Thereupon, said metal bath serves either for increasing the amount of pig iron available in an integrated metallurgical plant and hence for increasing the production, or for saving on raw materials, energy and $CO_2$ production in the primary units coking plant and blast furnace.

EXAMPLE B

The indicated amounts of slags and dusts are typical specific amounts as they accumulate during the production of 1 ton of liquid stainless steel.

The amounts of reducing agent 29, auxiliary agents 27 and electric energy which are necessary therefor have been calculated and are indicated as well.

TABLE 1

Feed materials

| | Name | | |
|---|---|---|---|
| | Stainless slag % | Stainless dust % | Fly ash % |
| CaO | 46.13 | 18.59 | 4.28 |
| $SiO_2$ | 26.92 | 7.30 | 51.21 |
| $Al_2O_3$ | 6.30 | 0.00 | 19.44 |
| MgO | 8.00 | 3.30 | 3.19 |
| C | 0.00 | 0.00 | 10.76 |
| $Cr_2O_3$ | 4.20 | 16.44 | 0.01 |
| Fe | 2.52 | 0.00 | 0.48 |
| FeO | 3.40 | 0.00 | 0.97 |
| $Fe_2O_3$ | 0.00 | 40.28 | 4.60 |
| MnO | 1.50 | 3.60 | 0.10 |
| NiO | 0.22 | 3.51 | 0.00 |
| $TiO_2$ | 0.73 | 0.00 | 0.85 |

317 kg/t LS of liquid stainless (AOD) slag 2 of the composition as indicated in Table 1 is cast from the AOD converter 1 into a slag ladle 3. The content of said slag ladle 3 is tipped into a transport ladle 5. Subsequently, the transport ladle 5 is mounted to a tilting stand 6 and the liquid slag 2 is poured slowly and continuously onto the Cr/Ni containing residual metal bath 25 in a tiltable pan-furnace-like reduction unit 7.

The energy (204 kWh/t LS) required for heating the slag 2 and for the compensation of heat losses as well as for the endothermic direct reduction of metal oxides (especially iron oxide but also high amounts of chromium oxide and nickel oxide) by means of dissolved carbon is introduced electrically via three electrodes 10.

The reduction of the metal oxides of the introduced slag 2 already occurs during filling in and concurrent heating via direct reduction, using the carbon dissolved in the alloyed pig iron. The spent carbon is replaced by the deep injection of reducing agent 29, i.e. 6.1 kg/t LS of coal dust and 2.0 kg/t LS of coke, into the metal bath 25 (analyses: see Table 2).

TABLE 2

Reducing agents

| | Name | |
|---|---|---|
| Components | Coal % | Coke % |
| C | 83.18 | 91.66 |
| $Al_2O_3$ | 2.83 | 1.79 |
| CaO | 0.57 | 0.26 |
| $Fe_2O_3$ | 0.74 | 0.00 |
| MgO | 0.45 | 0.15 |
| $SiO_2$ | 5.20 | 2.98 |
| $TiO_2$ | 0.16 | 0.07 |

In addition to the reducing agent 29, the residual materials 27 which typically accumulate in a stainless steelworks operation, i.e. 36 kg/t LS of stainless dust containing high amounts of Cr and Ni, are injected via injection lances 11 (composition also in Table 1). The injection occurs close to the boundary layer 26 between metal bath 25/foamed slag 2' in order to enlarge the surface of said boundary layer 26.

In order to adjust the optimal slag composition for a hydraulic binder as a clinker substitute, 70 kg/t LS of fly ash is additionally injected as an $SiO_2$ supplier. Advantageously, a fly ash having a comparatively high carbon content is used.

7 $Nm^3$ $N_2$/t LS is required for the pneumatic injection and bottom flushing.

Reduction initially takes place with carbon at a temperature of 1430° C. In said temperature range, a foamed slag 2' forms due to the CO forming during reduction. The large contact area of the metal oxides with the metal droplets selectively dispersed therein produces an efficient direct reduction via the carbon dissolved in the metal droplets.

In order to improve the energy balance and to achieve the indicated electric heating capacity value, a partial postcombustion of the CO forming during reduction is effected by means of $O_2$. 4.0 kg/t LS of $O_2$ is injected via $O_2$-lances 15 in the upper third of the foamed slag 2' and oxidizes 25% of the CO to $CO_2$. This comparatively low degree of postcombustion is easily controllable and results in an efficient heat transfer of the energy released thereby back into the foamed slag 2' and into the metal melt 25. The injection of $O_2$ is performed such that said oxidation zone 32 is prevented, as far as possible, from mixing with the reduction zone 31, in which the reduction of the metal-oxide particles takes place.

As a result of the subsequent complete combustion, only $CO_2$ can be found in the waste gas, namely 44 kg/t LS. This is a very low value which can be achieved only by the preferred direct reduction and electric heating and correspondingly provides advantages in view of the impending $CO_2$-taxes.

At 1.2 kg/t LS, the dust content is extremely low because of the deep injection of coal and due to the filter effect of the foamed slag 2', which represents an advantage in terms of the discharging and avoidance of filter dust.

After the phase of charging the stainless slag 2, the stainless dusts 27 and the fly ash and after reduction by means of the carbon dissolved in the metal bath 25, which carbon has been replaced by the injection of reducing agents 29, a slag sample is drawn and conformity with the precalculated analysis is checked. Subsequently, 1 kg/t LS of Fe75Si is added as a stronger reducing agent in order to reduce the contents of poorly reducible oxides, especially of $Cr_2O_3$, and a latency of 5 min is observed. The achieved target analysis of 354 kg/t LS of slag 16 that has been produced is included in Table 3.

TABLE 3

Slag product

| Component | % |
|---|---|
| CaO | 44.59 |
| SiO2 | 35.86 |
| Al2O3 | 9.66 |
| MgO | 8.24 |
| TiO2 | 0.80 |
| MnO | 0.50 |
| FeO | 0.20 |
| Fe_met. | 0.10 |
| Cr2O3 | 0.02 |
| P2O5 | 0.01 |
| Sum | 99.98 |

Subsequently, the temperature is raised to 1460° C. in order to obtain, on the one hand, the temperature required for the subsequent granulation of the treated slag 16 and in order to promote, on the other hand, the depositing of the dispersed metal droplets from the foamed slag 2' as a result of the reduced viscosity. For this purpose, a latency of 5 min is observed.

Subsequently, the slag except for a remaining quantity is poured into a transport ladle 18 by tilting the pan reactor 7. The content of the transport ladle 18 is charged into a dry granulator 19. Granulation involving a quick and thus glass-like solidification is effected by splitting the slag jet into fine droplets on a rotation disk and by rapidly cooling the fine droplets in the air stream.

The metal bath 25 including 50 kg/t LS of metal obtained from reduction (analysis: see Table 4) is not tapped after each slag treatment in the pan reactor 7 but remains therein until sufficient freeboard for the foamed slag 2' is no longer provided. Typically, this is the case after five treatments, however, if necessary, it may be varied via the geometry of the pan reactor 7.

TABLE 4

Metal product

| Component | % |
|---|---|
| Fe | 58.12 |
| C | 5.00 |
| Cr | 26.20 |
| Mn | 6.77 |
| Ni | 3.08 |

TABLE 4-continued

| Metal product | |
|---|---|
| Component | % |
| P | 0.10 |
| S | 0.04 |
| Sum | 99.31 |

Subsequently, the pan reactor is brought back into the treatment position, and the next batch of LD slag 2 is again added slowly and continuously. The remaining process steps are also repeated according to the above-indicated pattern.

Following the five treatments, also the metal bath 25, except for a metal sump of a height of at least 0.6 m, is tapped and, if necessary, is subjected to De-P treatment. Thereupon, said metal bath serves either for increasing the amount of pig iron available in an integrated metallurgical plant and hence for increasing the production, or for saving on raw materials, energy and $CO_2$ production in the primary units coking plant and blast furnace.

A major advantage of the process according to the invention is the possibility to perform a selective fine adjustment of the slag that has been produced by injecting various residual materials and, if necessary, also auxiliary agents. Preferably, the demand for the various feed materials is calculated in a process model based on the known analysis of the feed materials and the respective amounts are injected by controlling the parameters of the injection plant. An examination is performed by taking samples of slag and metal bath.

One the one hand, the temperature can be determined by using an automated temperature lance (immersion thermocouple). On the other hand, the temperature can be controlled in the interim, preferably continuously, by means of a pyrometer.

The invention claimed is:

1. A process for treating slag consisting of steelwork slag from a steelwork converter, wherein the steelwork slag contains oxidic iron particles, the process comprising:
    charging the steelwork slag into a reactor vessel onto a residual iron melt containing dissolved carbon, the charging being conducted slowly and continuously over an extended period of time;
    electrically heating contents of the reactor vessel over an extended period of time;
    injecting a carbon-containing reducing agent with gas by means of a lance over an extended period of time into a region close to a boundary surface between the slag and the iron melt or directly into the iron melt so that carbon of the reducing agent is dissolved in the iron melt and the iron melt and the slag are mixed, the dissolving of the carbon of the reducing agent in the iron melt occurring over an extended period of time;
    reducing oxidic iron particles of the slag thereby forming metallic iron and CO over an extended period of time;
    forming a foamed slag by the resulting CO over an extended period of time,
    introducing an oxygen-containing gas into the foamed slag and post-combusting the CO to $CO_2$ over an extended period of time;
    bottom flushing the reactor vessel with inert gas over an extended period of time; and then
    discharging the slag,
    wherein the oxygen-containing gas is introduced into an upper half of a height of the slag.

2. A process according to claim 1, further comprising slow and continuous injection of metallurgical residual materials with gas over an extended period of time by means of a lance into a region close to the boundary surface between the slag and the iron metal or directly into the iron melt with the iron melt and the slag being mixed.

3. A process according to claim 1, further comprising slow and continuous injection of auxiliary agents via gas over an extended period of time by means of a lance into a region close to the boundary surface between the slag and the iron melt or directly into the iron melt, whereby the iron melt and the slag are mixed.

4. A process according to claim 2, wherein the residual materials and the auxiliary agents are injected into the reactor vessel at a different height level than the reducing agent.

5. A process according to claim 4, wherein at least one of the carbon-containing reducing agent, the residual materials and the auxiliary agents is injected transversely against the boundary surface of the iron melt present in the reactor vessel and of the slag located above the iron melt.

6. A process according to claim 1, wherein process steps to be performed over the extended period of time are carried out synchronously beginning at the charging of the slag into the reactor vessel until the discharging of the slag.

7. A process according to claim 1, wherein the carbon-containing reducing agent is injected until a maximum saturation limit of carbon has been reached in the iron melt.

8. A process according to claim 1, wherein the heating is electric heating effected via an electric arc or resistance heating.

9. A process according to claim 1, wherein the slag is charged at least partially in a liquid form.

10. A process according to claim 1, wherein the metal oxides are reduced primarily via direct reduction by the carbon dissolved in the metal melt.

11. A process according to claim 1, further comprising introducing a reducing agent stronger than carbon in a final stage of the reduction prior to the discharging of the slag.

12. A process according to claim 1, further comprising adding auxiliary agents for conditioning the slag upon completion of the addition of the reducing agent.

13. A process according to claim 1, further comprising adding iron-oxide containing ores to the reactor vessel.

14. A process according to claim 1, further comprising measuring the height of the slag and correcting the height of the slag if a maximum admissible height is exceeded and if the height of the slag is less than a limiting value of the slag height.

15. A process according to claim 2, further comprising allowing metal droplets to be deposited from the slag after the introduction of at least one of the metallurgical residual materials, auxiliary agents injected via the lance for mixing the iron melt and the slag, and the reducing agent and prior to the discharging of the slag.

16. A process according to claim 1, further comprising granulating the slag and wherein the slag is treated in the reactor vessel at a lower temperature than for the granulation of the slag.

17. A process according to claim 1, further comprising, subsequent to discharging the slag, discharging a portion of the iron melt, whereby a residual iron melt containing dissolved carbon is left in the reactor vessel.

18. A process according to claim 17, wherein the lance has lateral discharge openings, and substances to be injected are injected via the lateral discharge openings of the lance in a horizontal direction or slightly transversely toward the boundary surface.

19. A process according to claim 1, wherein the slag is discharged by tilting the reactor vessel.

20. A process according to claim 1, wherein the gas injected with the carbon containing reducing agent is an inert gas.

21. A process according to claim 2, wherein the metallurgical residual materials comprise at least one selected from a group comprising scrap yard residues, iron-oxide containing dusts from gas-purification processes, slurries from gas-purification processes, and scales.

22. A process according to claim 3, wherein the auxiliary agent comprises at least one selected from a group comprising bauxite, lime powder and silicon carriers.

23. A process according to claim 11, wherein the reducing agent comprises at least one selected from a group comprising aluminum, ferrosilicon or calcium carbide.

24. The process of claim 1, wherein the steelwork slag is a product of at least one of a group comprising an LD-converter, a pan-furnace, an AOD-converter, or a desulphurization process.

25. The process of claim 9, wherein solidified slag is introduced into the reactor vessel over an extended period of time.

26. A process for treating slag consisting of steelwork slag from a steelwork converter, wherein the steelwork slag contains oxidic iron particles, the process comprising:
  charging the steelwork slag into a reactor vessel, and onto a residual iron melt containing dissolved carbon, the charging being conducted slowly and continuously over an extended period of time;
  electrically heating contents of the reactor vessel over an extended period of time;
  injecting a carbon-containing reducing agent with gas by means of a lance over an extended period of time into a region close to a boundary surface between the slag and the iron melt or directly into the iron melt so that carbon of the reducing agent is dissolved in the iron melt and the iron melt and the slag are mixed, the dissolving of the carbon of the reducing agent in the iron melt occurring over an extended period of time;
  reducing oxidic iron particles of the slag thereby forming metallic iron and CO over an extended period of time;
  forming a foamed slag by the resulting CO over an extended period of time;
  introducing an oxygen-containing gas into the foamed slag at an upper half of a height of the slag and post-combusting the CO to $CO_2$ over an extended period of time;
  bottom flushing the reactor vessel with inert gas over an extended period of time;
  then discharging the slag; and
  injecting slowly and continuously metallurgical residual materials with gas over an extended period of time by means of a lance into a region close to the boundary surface between the slag and the iron metal or directly into the iron melt, with the iron melt and the slag being mixed,
  wherein at least one of the auxiliary agents and residual materials are injected in a height region on both sides of the boundary surface between the slag and the iron melt, which height region extends over a maximum of 25% of the total height of the slag or of the iron melt.

27. The process of claim 26, wherein the steelwork slag is a product of at least one of a group comprising an LD-converter, a pan-furnace, an AOD-converter, or a desulphurization process.

* * * * *